Feb. 13, 1951     E. H. MUELLER     2,541,433
GAS BURNER MIXING TUBE
Filed July 10, 1948
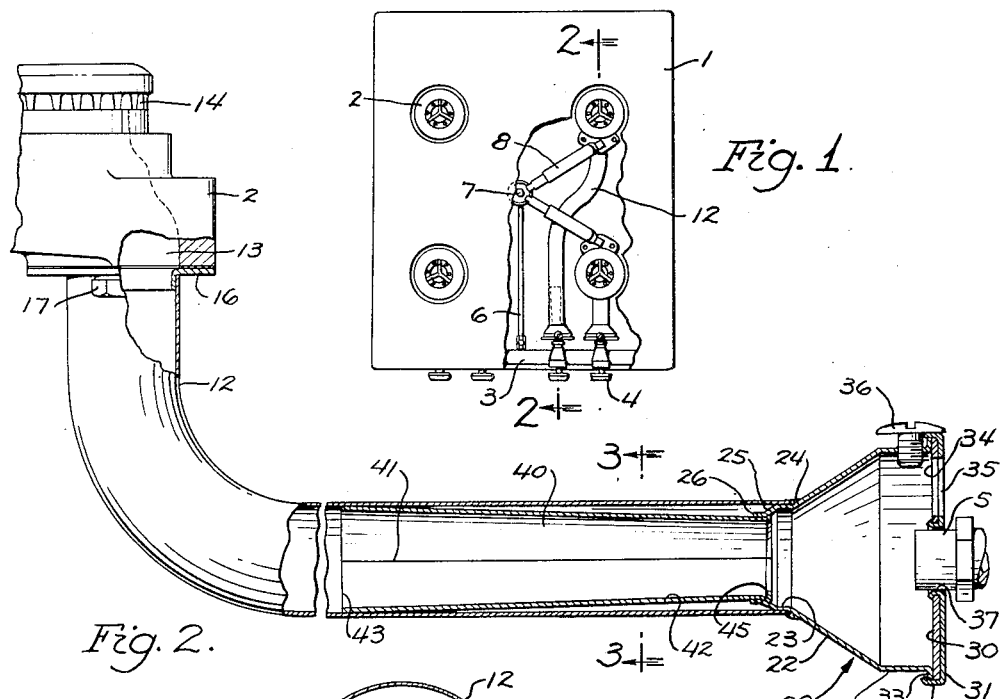
Fig. 1.
Fig. 2.
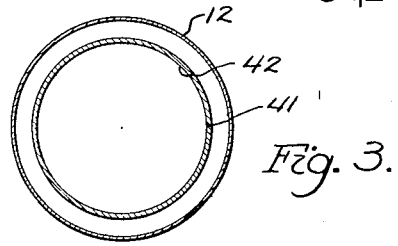
Fig. 3.
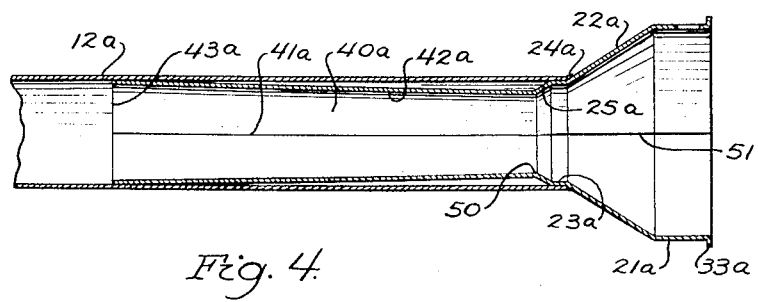
Fig. 4.
INVENTOR.
Ervin H. Mueller
BY
Barnes, Kisselle, Laughlin & Raisch
ATTORNEYS.

Patented Feb. 13, 1951

2,541,433

UNITED STATES PATENT OFFICE 2,541,433

GAS BURNER MIXING TUBE

Ervin H. Mueller, Grosse Pointe, Mich.

Application July 10, 1948, Serial No. 37,990

1 Claim. (Cl. 158—118)

This invention relates to gas burners and it has to do particularly with the so-called mixing tube which conducts the combustible mixture of air and gas to the burner.

As is well known to those versed in the art, the gas is discharged from an outlet port of a valve or the like into the open end of the mixing tube. The open end of the mixing tube is ordinarily enlarged and is usually provided with a shutter or valving means for controlling the entrance of air into the mixing tube. Inwardly from the discharge port for the gas, and inwardly from the open end of the mixing tube, the mixing tube is of reduced cross dimensions providing a restriction or throat and progressing inwardly from the throat, meaning toward the burner, the mixing tube is of gradually enlarging tapering formation. This construction constitutes a form of Venturi tube so that the jet of a gas causes flow of air into the mixing tube, the amount of air being controllable by the shutter. In some instances, there may be no shutter control for the air.

Such mixing tubes for burners have heretofore been largely made of cast metal with the tubing having the enlarged inlet end or bell portion, the constricted portion or throat and a tubular portion of tapering form which gradually enlarges, at least for a distance, in the direction of the burner. Attempts have been made to make the mixing tubes of formed sheet metal. Due to the tapering form and other shapes required, difficulties have been encountered and the sheet metal tube is required to be treated as, for example, by a swedging operation to give it the required throat and tapering formation. This has not been found to be completely satisfactory for numerous reasons. One reason is that the idea of making the mixing tube of sheet metal was to reduce cost but this has not been accomplished in full because of the manufacturing cost of the added manufacturing operations.

The present invention aims to provide an improved mixing tube structure formed of suitably fashioned sheet metal parts wherein the proper or desired Venturi formation is attained without requiring parts which are swedged or otherwise similarly treated. In making reference to the Venturi formation, as in the above sentence, the intended meaning is that of the throat and the gradually tapering or widening walls inwardly of the throat as well also as the inlet end or bell portion of the mixing tube. To this end, the main body of the mixing tube is constituted by a tube or pipe which may be of uniform cross dimensions from the burner to the bell portion, and the bell portion or inlet end is provided by a separate suitably shaped sheet metal member which is joined to one end of the main body portion of the mixing tube. The Venturi structure is provided by an element separate from the main tube and disposed largely in the mixing tube, this element being fashioned from sheet metal and associated with the bell portion so as to provide the restricted throat and the tapering or enlarging formation which extends inwardly from the throat.

The accompanying drawings show structures made in accordance with the invention and in the drawings:

Fig. 1 is a general view illustrating the top burners of a gas range with the top plate cut away to expose the mixing tubes and other structure.

Fig. 2 is an enlarged cross sectional view taken substantially on line 2—2 of Fig. 1 illustrating the mixing tube construction.

Fig. 3 is a further enlarged sectional view taken substantially on line 3—3 of Fig. 2.

Fig. 4 is a sectional view of a mixing tube construction illustrating a modified form.

In Fig. 1 a portion of a gas range is shown, this having a top plate 1 with openings for several burners 2. The plate 1 is cut away to show the gas supply pipe or manifold 3, there being a series of valves each indicated at 4 for controlling the flow of gas to the burners, each valve having an outlet end 5 (Fig. 2) for the discharge of gas. Also, as illustrated, is a form of automatic lighter for the burners, this including a small gas supply pipe 6 for conducting gas to a pilot flame as at 7 while flash tubes extending between the pilot flame and each burner are illustrated at 8. This lighter arrangement is known to those versed in the art and has no particular bearing on the mixing tube structure of the present invention, but is shown to complete the picture.

Extending from each valve to a burner is a mixing tube indicated at 12 and, of course, these tubes will vary in length and in geometrical shape, depending upon the relative positions of the burners and their controlling valves.

As illustrated in Fig. 2, the burner 2 has a body with a passageway 13 for conducting the gas to a series of ports 14 from which the gas issues for supporting the flames. The mixing tube 12, as shown in Fig. 2, is formed of sheet metal fashioned into tubular form and provided with a suitable seam which is welded or otherwise closed. The tube illustrated in Fig. 2 has an upward bend and, as shown in Fig. 1, has a lateral bend because of the relative position of the burner and its valve and this shape, of course, is variable as desired. The inner or burner end of the tube is suitably attached to the burner as by means of a flange 16 which may be secured to the end of the tube and which is secured to the burner body in a suitable manner as by means of one or more cap screws 17. This tube, as will be observed, is of uniform diameter from end to end and it is preferably obtained by severing the same from tubing which is manufactured in long lengths.

The bell or inlet, as generally shown at 20, is formed by a stamped or drawn blank of sheet metal and it advantageously has a portion 21 of a determined diameter and a tapering or funnel shaped portion 22. Extending from the portion 22 is a land or seat portion 23 which telescopingly receives the end of the tube 12. The end of the tube 12 and the bell member are brazed or otherwise secured together as indicated at 24. Inwardly of the land 23 the bell member has a further tapered or ensmalled portion 25 and its inner end terminates in an ensmalled extension 26.

Suitable shutter means may be applied to the open end of the bell, this being shown as in the form of a disc 30 non-rotatably associated with the end of the bell and a disc 31 positioned in face to face relationship with the disc 30, the disc 31 having a flange 32 which rotatably fits over an outward flange 33 on the bell. The two discs have apertures 34 and 35 which may be brought into varying degrees of registration by rotation of the disc 31 and the disc 31 may be held in position by a screw 36 threaded into the wall of the bell. The two discs have a central opening which may be provided by an inner edge 37 of the outer disc which is fashioned over the inner edge of the inner disc 30, this opening serving to receive the outlet jet element 5 of the valve.

The throat and the tapered form of the Venturi construction is constituted by a separate element generally indicated at 40. This element is fashioned from a sheet metal blank into hollow cross sectional form, as shown in Fig. 3, with the edges brought substantially into abutting relationship as illustrated at 41, but which edges need not be united. This member is of tapering form as shown, having a tapering wall 42. The inner end of the member, as shown at 43, preferably snugly fits within the tube 12. The ensmalled end fits into the extension 26 of the bell. The Venturi member 40 and the bell are preferably united and one way of accomplishing this is to flare the extreme end of the Venturi member outwardly as at 45 so that it laps over the portion 25. The assembly may be made as follows: The small end of the member 40 is telescoped into the portion 26 of the bell and then the inner end is flared outwardly by a suitable flaring tool which is passed into the same through the open end of the bell. With the bell and the Venturi member thus assembled, the sub-assembly is mounted in the tube 12 and the end of the tube secured to the bell, as, for example, by the brazed joint 24. The air shutter discs may be mounted to the bell either before or after the sub-assembly is mounted in the tube 12.

Thus, it will be seen that the exterior of the mixing tube is constituted by the pipe or tube 12 which is of uniform diameter from end to end. The throat and Venturi arrangement is provided by the inner end of the bell and by the member 40 which parts, of course, are not visible from the exterior. Due to the fact that the member 40 is relatively short in length, a suitably shaped blank may be selected and fashioned into cross sectional form as above indicated. In an accepted mixing tube structure, the throat should be of certain prescribed diameter and the taper of the venturi should be of a prescribed angle and should have a length which bears a specified relationship with the diameter of the throat. These specifications can be easily met with the present construction. If the tapering construction is of the prescribed length, it makes no difference that the tube 12 from the end of the member 40 to the burner is of uniform diameter.

In the modified arrangement shown in Fig. 4, the bell and the Venturi or tapered tube member is made as one element. In this form the bell has its outer end at 21a and may be provided with a flange 33a for receiving the air shutter structure, not shown, and it has the tapered portion 22a with a land 23a for receiving the end of the tube 12a. The joint may be completed as by brazing, as indicated at 24a. Inwardly from the land 23a is an inwardly tapered part 25a which ensmalls to provide the throat as at 50. From the throat 50 the combined bell and Venturi member has a portion 40a with tapering walls 42a which gradually increases in diameter to the inner end 43a which preferably has a sliding fit in the tube 12a. In this modified form, the combined bell and Venturi member may be from a sheet metal blank with the edges thereof in substantially abutting relationship. The edges 41a of the Venturi member need not be united although the edges in the bell portion which is exterior of the tube 21a are preferably brazed or otherwise seamed together as indicated at 51.

I claim:

A mixing tube structure for a gas burner comprising, a tube adapted to be secured at one end to a burner and being substantially of uniform diameter from end to end, a bell member of formed sheet metal having a tapering intermediate portion and an outer relatively large end at the large end of the intermediate portion adapted to be associated with a source of gas supply, the bell member having a substantially cylindrical land at the small end of the intermediate portion telescopingly fitted into the opposite end of said tube and connected thereto, the bell member having a second tapering portion on the side of the land opposite the said intermediate portion which projects into said tube and terminates at an inner relatively small end of the bell member located within said tube, an elongated tapered hollow Venturi element of formed sheet metal with the edges of the sheet disposed lengthwise thereof and lengthwise of said tube in abutting relationship, said Venturi element having a relatively small end disposed in communication with the inner end of the bell member and together therewith providing a restricted throat, the Venturi element projecting into said tube and having the outer peripheral surfaces of its large end in engagement with internal surfaces of said tube.

ERVIN H. MUELLER.

REFERENCES CITED

The following references are of record in the file of this patent:

UNITED STATES PATENTS

| Number | Name | Date |
| --- | --- | --- |
| 1,161,940 | Lewis | Nov. 30, 1915 |
| 1,170,765 | Lindemann | Feb. 8, 1916 |
| 1,399,788 | Needham | Dec. 13, 1921 |
| 1,809,425 | Roberts | June 9, 1931 |
| 1,815,322 | Meader | July 21, 1931 |

FOREIGN PATENTS

| Number | Country | Date |
| --- | --- | --- |
| 79,417 | Switzerland | Apr. 1, 1919 |
| 210,301 | Great Britain | Jan. 31, 1924 |